Figure 1:
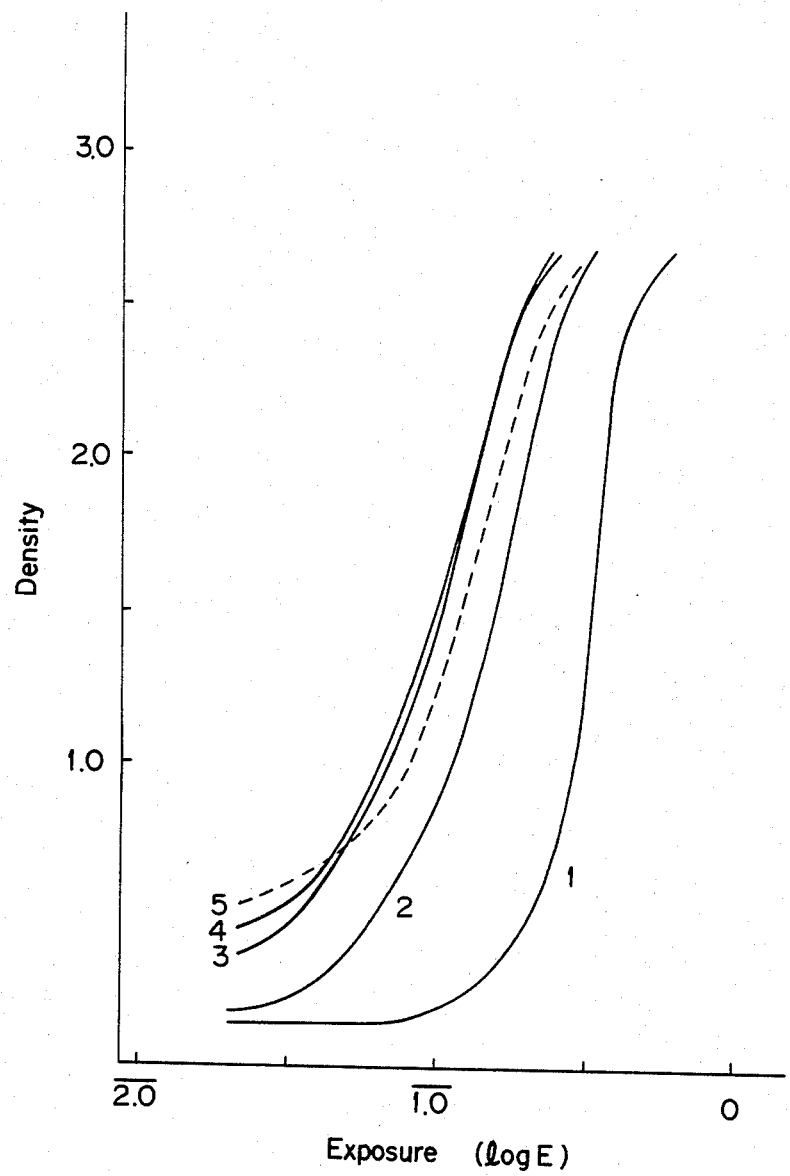

United States Patent [19]

Kagawa et al.

[11] Patent Number: 4,517,284
[45] Date of Patent: May 14, 1985

[54] LIGHT-SENSITIVE SILVER HALIDE PHOTOGRAPHIC MATERIAL

[75] Inventors: Nobuaki Kagawa; Noboru Fujimori, both of Hino; Shigeo Tanaka; Kaoru Onodera, both of Odawara, all of Japan

[73] Assignee: Konishiroku Photo Ind. Co., Ltd., Tokyo, Japan

[21] Appl. No.: 442,768

[22] Filed: Nov. 18, 1982

[30] Foreign Application Priority Data

Nov. 26, 1981 [JP] Japan ................. 56-190383
Nov. 26, 1981 [JP] Japan ................. 56-190384

[51] Int. Cl.³ .............................. G03C 1/02
[52] U.S. Cl. ...................... 430/591; 430/550
[58] Field of Search ......... 430/550, 577, 591, 949, 430/267

[56] References Cited

U.S. PATENT DOCUMENTS

| | | | |
|---|---|---|---|
| 3,567,458 | 3/1971 | Milton | 430/591 |
| 3,713,828 | 1/1973 | Hayashi et al. | 430/591 |
| 3,804,634 | 4/1974 | Shiba et al. | 430/575 |
| 3,915,713 | 10/1975 | Shiba et al. | 430/602 |
| 4,160,669 | 7/1979 | Habu et al. | 430/591 |
| 4,173,483 | 11/1979 | Habu et al. | 430/550 |

FOREIGN PATENT DOCUMENTS 2213473 10/1972 Fed. Rep. of Germany .

*Primary Examiner*—J. Travis Brown

*Attorney, Agent, or Firm*—Frishauf, Holtz, Goodman & Woodward

[57] ABSTRACT

A light-sensitive silver halide photographic material having at least one silver halide emulsion layer on a support, characterized in that the said silver halide comprises silver halide grains containing at least 80 molar % of silver chloride and at least one of merocyanine dyes having the formula

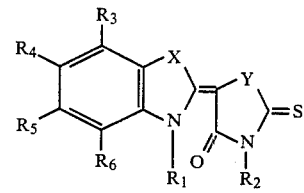

wherein $R_1$ and $R_2$ individually represent an alkyl group, an alkenyl group or an aryl group provided that at least one of $R_1$ and $R_2$ is an alkyl or aryl group having a sulfo group; $R_3$, $R_4$, $R_5$ and $R_6$ individually represent a hydrogen atom, a halogen atom, a lower alkyl group, a lower alkoxy group or a phenyl group and any one pair of $R_3$ and $R_4$, $R_5$ and $R_6$, $R_1$ and $R_6$ or $R_4$ and $R_5$ may joint each other to form a ring; X is an oxygen atom, a sulfur atom or a selenium atom; and Y is an oxygen atom, a sulfur atom or a selenium atom provided that at least one of X and Y represents a selenium atom.

12 Claims, 5 Drawing Figures

LIGHT-SENSITIVE SILVER HALIDE PHOTOGRAPHIC MATERIAL

This invention relates to a light-sensitive silver halide photographic material. More particularly, this invention relates to a light-sensitive high-chloride silver halide color photographic material which has been blue-sensitized with a certain merocyanine dye, especially to a color photographic paper.

It is known that a high-chloride silver halide emulsion, which is meant to refer to a silver halide emulsion containing not less than 80 molar % of silver chloride, is capable of being rapidly processed. Some reasons therefor may be supposed, but it is believed that the one reason therefor is due to its high solubility. In the prior art light-sensitive silver halide photographic materials, particularly photographic papers, a blue-sensitive emulsion layer using silver halide grains with a large grain size is placed therein at the lowest layer and hence there has been presented a problem about reduced developability of the blue-sensitive emulsion layer. However, this problem can be solved and also a development time can be greatly shortened by using a high-chloride silver halide emulsion. Moreover, silver chloride does hardly absorb visible ray and, therefore, where it is employed in a light-sensitive silver halide photographic material, a difference in blue-sensitivity between a green-sensitive emulsion and a red-sensitive emulsion is more broadened, a color turbidity is reduced and a good color reproduction can be accomplished. On the other hand, it becomes very disadvantageous, however, that a silver chloride emulsion shows a narrow photosensitive region for employing as a blue-sensitive emulsion. Also, the present inventors' studies revealed that, when the high-chloride silver halide emulsion is to be chemically ripened with a sulfur sensitizer such as sodium thiosulfate, a remarkable sensitization can be observed only within a lower concentration range in a rational curve at the initial stage and subsequently a course is passed through wherein sensitization can be observed from a middle concentration range through a higher concentration range and gradation can be nearly restored. In this instance, the time when gradation is restored, the time when photographic fog begins to be increased and the time when the maximum sensitivity becomes available are highly approximated and there is, accordingly, such a defect that a range for satisfactory photographic performances is restricted to an extremely narrow time range. This can be much more remarkably observed in the case of relatively large grains and, before gradation is restored, photographic fog begins also to be increased. Then, it has become apparent that satisfactory photographic performances are in fact unable to be accomplished.

An induction period for chemical ripening of the high silver chloride emulsion is comparatively longer, together with subsequent rapid changes thereof, and there have been obtained the results of poor reproducibility as photographic performances of the chemically ripened emulsion.

The silver chlorobromide containing as a main ingredient silver bromide as employed in a light-sensitive silver halide photographic material, especially photographic paper, does not correspond to spectral characteristics of an yellow object because of its spectral absorption inclined to an ultraviolet region. In order to obviate the defect of the resultant bad color reproducibility of the so produced yellow dye, it has been attempted to color-sensitize a blue-sensitive emulsion layer so as to give absorbability to a longer wave length region. Further, it has been proposed that absorbability to a longer wave length region is given to the silver halide emulsion for a shortened exposure time because of energy distribution of an exposure light source inclined to a longer wave length region. For instance, there have been suggested a color sensitization method using certain merocyanine dyes as disclosed in Japanese Patent Publications No. 19034/1970, No. 30023/1971, No. 36076/1971 and so on; and a sensitization method using certain cyanine dyes as disclosed in Japanese Patent Publication No. 37538/1975 and so on. However, these prior art methods do not disclose any teachings about possible sensitization where used for a high-chloride silver halide emulsion as in the present invention, nor mention any possible obviated defects as seen in the case of silver chloride applied to a high light-sensitive material for color photography.

It is known that a silver chloride emulsion has an excellent developability, as compared with the silver chlorobromide emulsion customarily employed (containing 90 molar % of silver bromide). However, this emulsion has serious defects that the light-sensitive region inherent in a silver halide is limited to 400 nm, simultaneously with easy photographic fog, and also photographic performances of the chemically ripened emulsion become significantly variable. More specifically, in order to satisfactorily display excellent characteristics in developability as a light-sensitive silver halide photographic material, there have been requests for retaining less photographic fog, enhancing reproducibility of chemical ripening and further accomplishing sufficient color sensitization.

It is, accordingly, a primary object of this invention to provide a light-sensitive silver halide photographic material having a high blue-sensitivity which is able to be rapidly processed.

Another object of this invention is to provide a light-sensitive silver halide color photographic material with less photographic fog, less color stain and good color reproducibility.

Still another object of this invention is to provide a high sensitive silver halide color photographic material having minor changes in sensitivity, to which rapid processing is applicable, by the use of the high-chloride silver halide emulsion having a remarkably enhanced stability of photographic performances with chemical ripening.

In view of the foregoing, the present inventors have made earnest studies and, as a result, found out that the aforesaid objects can be accomplished by the use of a light-sensitive silver halide photographic material of this invention. The present photographic material is a light-sensitive silver halide photographic material having at least one silver halide emulsion layer on a support, characterized in that silver halide in said emulsion layer comprises silver halide grains containing at least 80 molar % of silver chloride and at least one of the merocyanine dyes having the following formula [I] is incorporated in said emulsion layer:

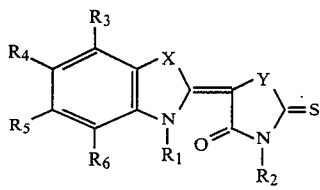

wherein R₁ and R₂ individually represent an alkyl group, an alkenyl group or an aryl group provided that at least one of $R_1$ and $R_2$ is an alkyl or aryl group having a sulfo group; $R_3$, $R_4$, $R_5$ and $R_6$ individually represent a hydrogen atom, a halogen atom, a lower alkyl group, a lower alkoxy group or a phenyl group and any one pair of $R_3$ and $R_4$, $R_5$ and $R_6$, $R_1$ and $R_6$ or $R_4$ and $R_5$ may joint each other to form a ring; X is an oxygen atom, a sulfur atom or a selenium atom; and Y is an oxygen atom, a sulfur atom or a selenium atom provided that at least one of X and Y represents a selenium atom.

In the above formula [I], the alkyl group in the definition of $R_1$ or $R_2$ has preferably 1 to 7 carbon atoms and may include, for example, a methyl group, a butyl group, an isopropyl group, a cyclohexyl group, a cyclopentyl group and the like, said groups optionally having as substituent(s), for example, a hydroxy group, a methoxy group, a sulfo group, an ethoxycarbonyl group, a carbamoyl group, an aryl group and the like; the alkenyl group may include, for example, an allyl group and the like; the aryl group may include, for example, a phenyl group and the like, said phenyl group optionally having as substituent(s), for example, a methoxy group, a sulfo group, a methyl group and the like. At least one of $R_1$ and $R_2$ should be an alkyl or aryl group having a sulfo group and, preferably, $R_2$ is a sulfo-substituted alkyl or aryl group.

In the definitions of $R_3$, $R_4$, $R_5$ and $R_6$, the halogen atom may be, e.g. chlorine, bromine or fluorine; the lower alkyl group is preferably of 1 to 4 carbon atoms and may include, for example, a methyl group, an ethyl group and the like; the lower alkoxy group is preferably of 1 to 4 carbon atoms and may include, for example, a methoxy group, an ethoxy group and the like.

$R_4$ and $R_5$ may joint together to form a 6-membered ring and, as a whole, to form, for example, a naphtho[2,3-d]azole ring or a tetrahydronaphtho[2,3-d]azole ring or a dioxacyclopentane ring. $R_3$ and $R_4$ may joint together to form a naphtho[2,1-d]azole ring or tetrahydronaphtho[2,1-d]azole ring as a whole; $R_6$ and $R_5$ may joint together to form a naphtho[1,2-d]azole ring as a whole.

The merocyanine dyes [I] of this invention can include the compounds of the following formulas [II], [III], [IV] and [V]:

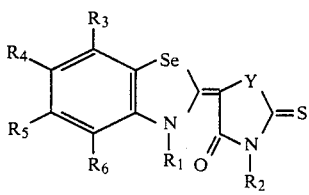

wherein $R_1$ through $R_6$ inclusive and Y are as defined above;

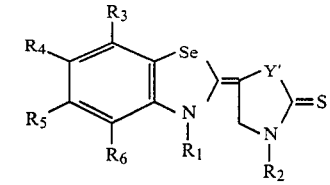

wherein $R_1$ through $R_6$ inclusive are as defined above and Y' is an oxygen atom or a sulfur atom;

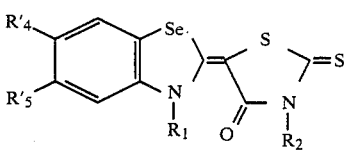

wherein $R_1$ and $R_2$ are as defined above and $R'_4$ and $R'_5$ individually represent a hydrogen atom, a lower alkyl group, a lower alkoxy group or a phenyl group; and

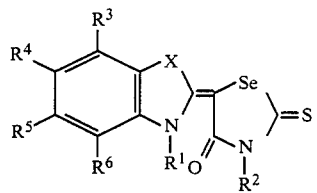

wherein $R_1$ through $R_6$ inclusive and X are as defined above.

In order to accomplish a good developability and a good color reproducibility with less color turbidity, the present material may preferably use a silver halide emulsion wherein a silver halide composition of the silver halide grain is not more than 1 molar % of silver iodide, not more than 20 molar % of silver bromide and at least 80 molar %, preferably 100 molar %, of silver chloride.

Color sensitizing techniques in the prior art could not have diminished the defects of reduced sensitivity, changes in sensitivity in chemical ripening, limited light-sensitive region and the like as produced where the present high-chloride silver halide emulsion is replaced by the prior art silver halide emulsion containing largely silver bromide. For instance, when the merocyanine dye as disclosed in Japanese Patent Publication No. 19034/1970 or the cyanine dye as disclosed in Japanese Patent Publication No. 37538/1975 is applied to the present high-chloride silver halide emulsion, a sensitizing effect can be partly observed, but a remarkably unsatisfactory increase in photographic fog is produced in chemical ripening.

However, it has been found that a high blue-sensitivity and good photographic characteristics with obviating the said defects can be attained by the addition of the merocyanine dye [I] according to this invention.

Representative examples of the present compound [I] are recited below for illustrative purposes, but this invention is not to be limited thereto.

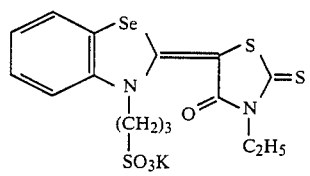
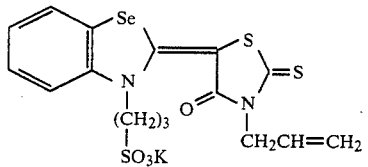
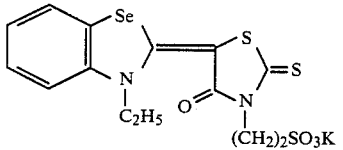
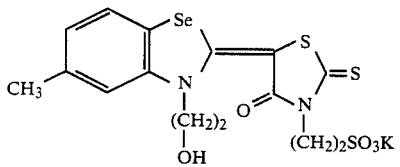
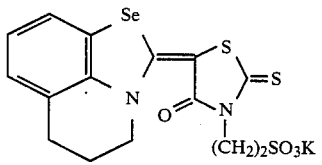
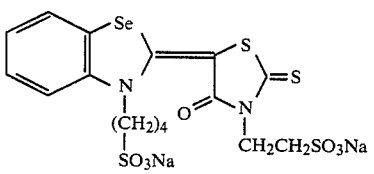
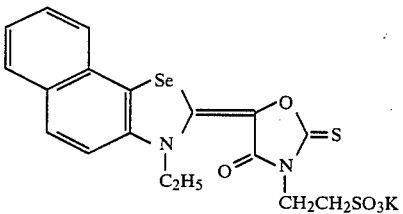
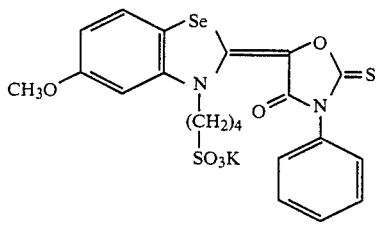
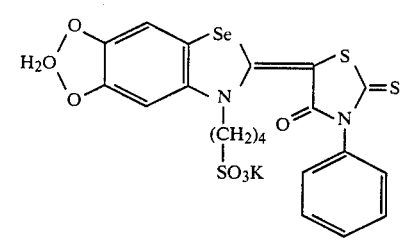
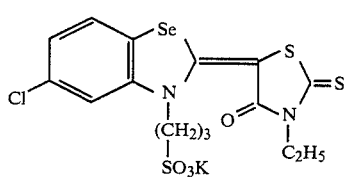
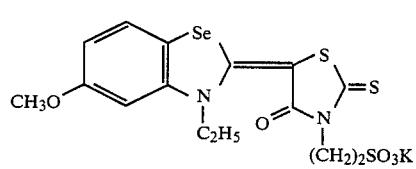
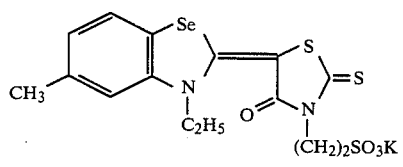
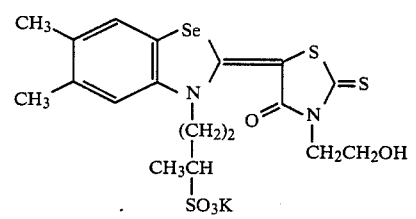
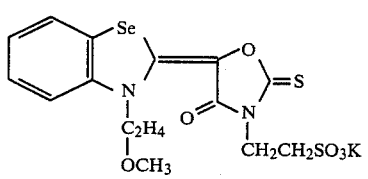
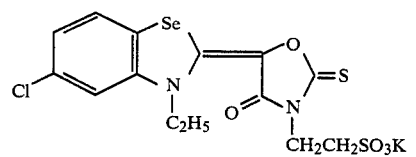
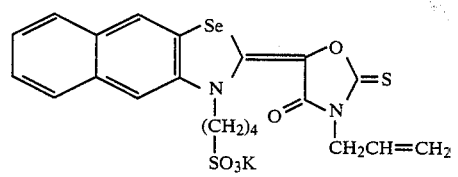

-continued
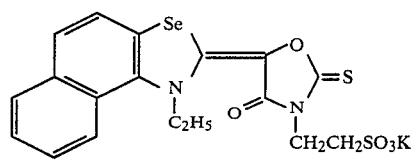 17
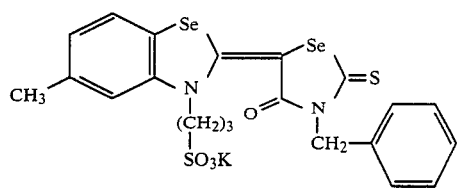 18
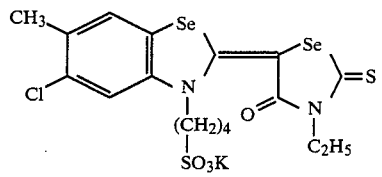 19
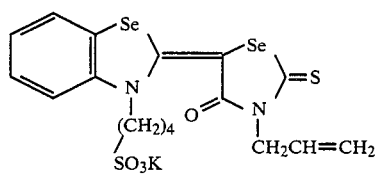 20
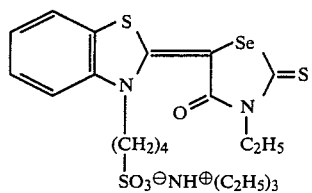 21
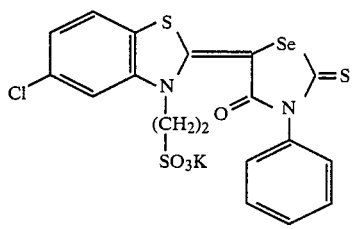 22
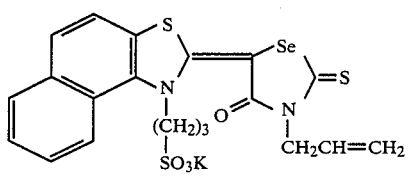 23
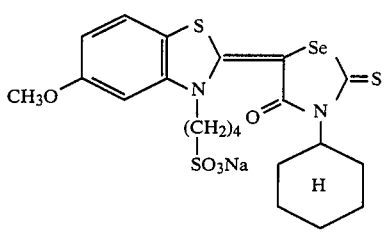 24
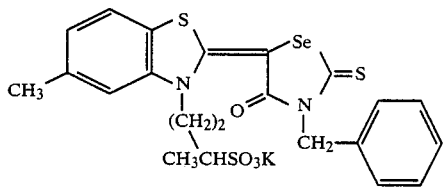 25
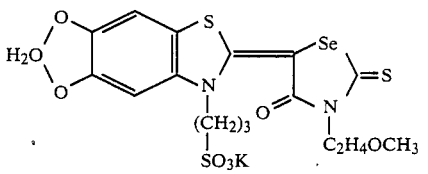 26
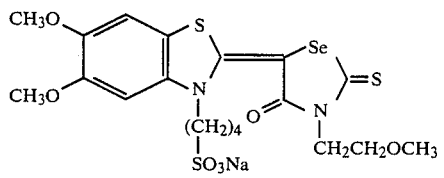 27
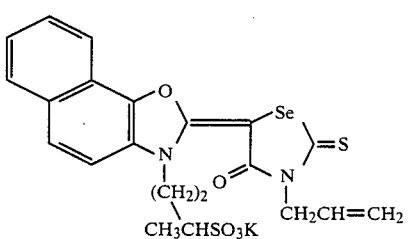 28
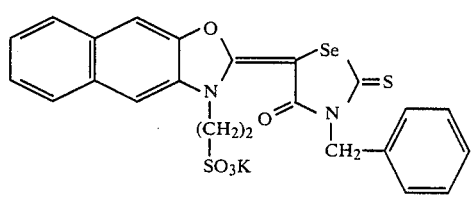 29
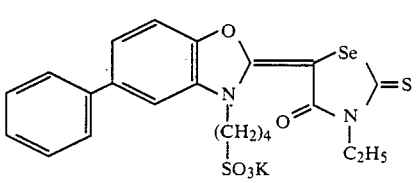 30

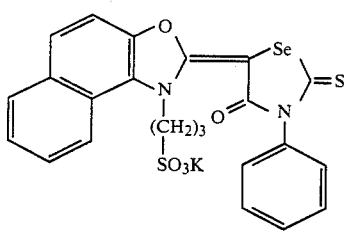 31

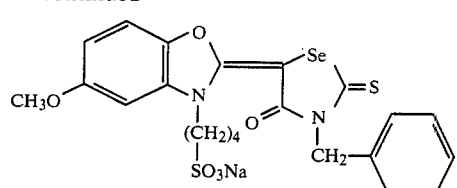 32

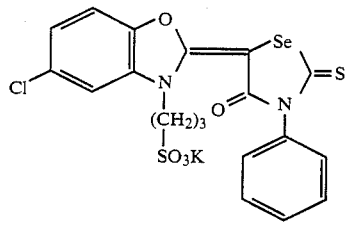 33

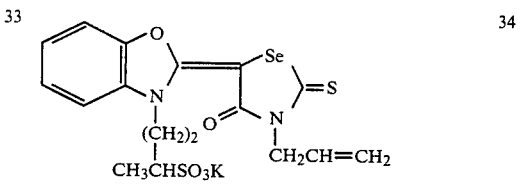 34

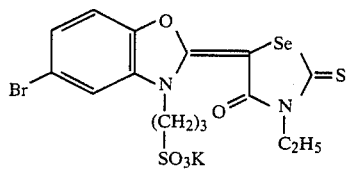 35

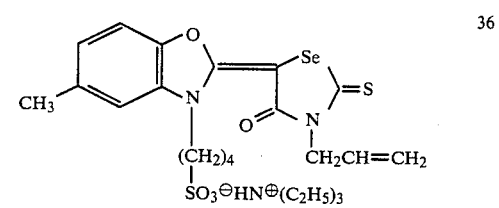 36

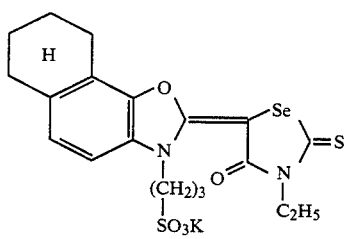 37

The dyes which may be employed in this invention may be synthesized according to well-known methods, for example, those as disclosed in The Cyanine Dyes and Related Compounds by F. M. Harmer, Interscience Publishers, 1964; U.S. Pat. Nos. 2,185,182, 2,519,001; and the like.

Examples of the synthesis will be illustrated by way of the following Synthesis Examples.

SYNTHESIS EXAMPLE 1

Potassium salt of 3-ethyl-5-[3-(3-sulfopropyl)-2(3H)benzoselenazolylidene]-2-thio-1,3-thiazolidine-2,4-dione (Illustrated dye No. 1)

To a solution of 9.2 g of 3-[2-(3-sulfopropylthio)-3-benzoselenazolio]propane-1-sulfonate and 3.2 g of 3-ethylrhodanine in a mixture of 80 ml of water and 80 ml of ethanol were added 4 g of triethylamine and the resulting mixture was stirred at room temperature for one hour. A solution of 2 g of potassium acetate in 40 ml of methanol was added thereto under stirring and the resulting mixture was cooled well in an ice box. The yellow crystalline substance thus separated was recovered by filtration and washed with ethanol to give 8.2 g of a crude crystal. It was recrystallized from a mixture of water and ethanol (1:1) to give 5.6 g of the desired yellow dye. m.p. over 300° C., λmax 429 nm (in methanol).

SYNTHESIS EXAMPLE 2

Potassium salt of 5-(3-ethyl-5-methyl-2(3H)benzoselenazolylidene)-3-(2-sulfoethyl)-2-thio-1,3-thiazolidine-2,4-dione (Illustrated dye No. 8)

To a solution of 11.0 g of 3-ethyl-2-ethylthio-5-methyl benzoselenazolium bromide and 8.4 g of potassium salt of 3-(2-sulfoethyl)rhodanine in 300 ml of a mixture of water and ethanol (1:1) were added 6 g of triethylamine and the resulting mixture was stirred at room temperature for 2 hours. The yellow crude crystalline substance (13.8 g) thus separated was recrystallized from a mixture of 24 l of water and 1.2 l of ethanol to give 11.7 g of the desired yellow crystal. m.p. over 300° C., λmax 430 nm (in methanol).

SYNTHESIS EXAMPLE 3

Triethylamino salt of 3-ethyl-5-[3-(4-sulfobutyl)-2(3H)-benzothiazolylidene]-2-thio-1,3-selenazolidine-2,4-dione (Illustrated dye No. 21)

To a solution of 8.0 g of 4-(2-methylthio-3-benzothiazolio)butane-1-sulfonate and 5.2 g of 3-ethyl-2-thio-1,3-selenazolidine-2,4-dione in 200 ml of ethanol were added 6 g of triethylamine and the resulting mixture was heated over a water bath for 15 minutes. After cooling, the so separated dye was recovered by filtration and washed with ethanol to give 9.4 g of the desired product as a crude crystal. m.p. 198°~200° C., λmax 432 nm (in methanol).

The compounds, sensitizing dyes, according to this invention may be incorporated into a silver halide emulsion by means of any well-known methods: For instance, there may be mentioned the method for incorporation by dispersion with a surface active agent as disclosed in Japanese Patent Publication No. 44895/1974 or Japanese Patent Provisional Publication No. 11419/1975; the method for incorporation as a dispersed form with a hydrophilic substrate as disclosed in Japanese Patent Provisional Publications No. 16624/1978, No. 102732/1978 and No. 102733/1978; the method for incorporation as a solid solution as disclosed in East German Pat. No. 143,324; and the like. Also, the dye may be incorporated into an emulsion in the form of a solution in an aqueous solvent such as water, methanol, acetone, a fluorinated alcohol and a mixture thereof. The present dye may be incorporated into an emulsion at any of the stages for preparing the emulsion, but preferably during or after chemical ripening.

The present dye may be incorporated usually at a ratio of $5 \times 10^{-5}$ to $3 \times 10^{-3}$ mole per mole of the silver halide, preferably $1 \times 10^{-4}$ to $7.5 \times 10^{-4}$ mole.

As explained above, the silver halide grain, which may be employed in this invention, contains at least 80 mole % amount of a silver halide therein and may be prepared according to any well-known methods such as those disclosed in "Chimie et Physique Photographique", by P. Glafkides, Paul Montel, 1967; "Photographic Emulsion Chemistry", by G. F. Duffin, The Focal Press, 1966; "Making and Coating Photographic Emulsion", by V. L. Zelikman et al, The Focal Press, 1964; and the like. More specifically, there may be employed any of an acidification method, a neutralization method, an ammonia method and so on. Also, there may be preferably employed any of a positive mixing method, a back mixing method and a simultaneous mixing method and the last method is particularly preferable.

The silver halide emulsion thus produced may be sensitized with any chemical sensitizer selected from those disclosed, for example, in "Research Disclosure", 17643. More illustratively, sensitization may be effected by using a sulfur sensitizer such as allylthiocarbamide, N,N-diphenylthiourea, sodium thiosulfate, cystine and the like; a selenium sensitizer such as tetramethylselenourea and the like; a noble metal compound, for example, a gold compound such as potassium chloroaurate, auric trichloride, potassium auric thiocyanate, 2-aurothiabenzthiazolemethyl chloride and the like, a palladium compound such as ammonium chloropalladate, sodium chloropalladite and the like, a platinum compound such as potassium chloroplatinate and the like, a ruthenium compound, a rhodium compound, an iridium compound and the like; or a combination thereof. Also, the emulsion may be subjected to reduction sensitization using hydrogen gas or a reducing agent such as stannous chloride and the like, in addition to the said chemical sensitization.

The sensitizing dye of this invention can be particularly preferably incorporated into the emulsion prior to the addition of the sensitizer or immediately after the said addition during chemical ripening step, without gradation change accompanied by chemical ripening and with an effect to reduce an induction period of sensitivity change. It is also known to add such a substance as adenine in order to improve gradation change accompanied by chemical ripening, but such technique has shown a defect of not only lowering the maximum available sensitivity but also increasing photographic fog relatively. The present invention can also obviate such a defect.

As the yellow dye-forming coupler which may be incorporated into the silver halide emulsion, there may be employed any of the open-chain ketomethylene type couplers well-known in the art. Illustratively, there may be employed, for example, a 4 equivalents coupler such as an α-benzoylacetamide type coupler having a water-soluble group as disclosed in Japanese Patent Publication No. 6030/1965; an α-benzoylacetamide type coupler as disclosed in U.S. Pat. Nos. 2,407,210, 2,875,057, 3,409,439, 3,551,155, 3,551,156, 3,649,276, 3,685,995 and British Pat. No. 1286411; an α-pivaloylacetamide type coupler as disclosed in U.S. Pat. No. 3,265,506; and the like, as well as a 2 equivalents coupler such as those disclosed in U.S. Pat. Nos. 3,277,155, 3,447,928, 3,408,194, 3,415,652 and West German Laid-Open Application No. P 22 13 461.

Illustrative examples of preferable yellow dye-forming couplers are as recited below.

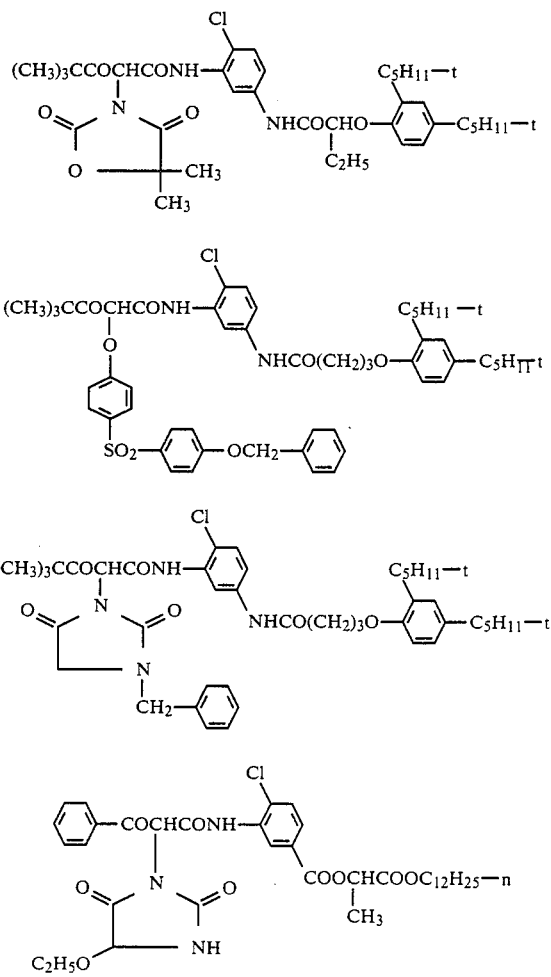

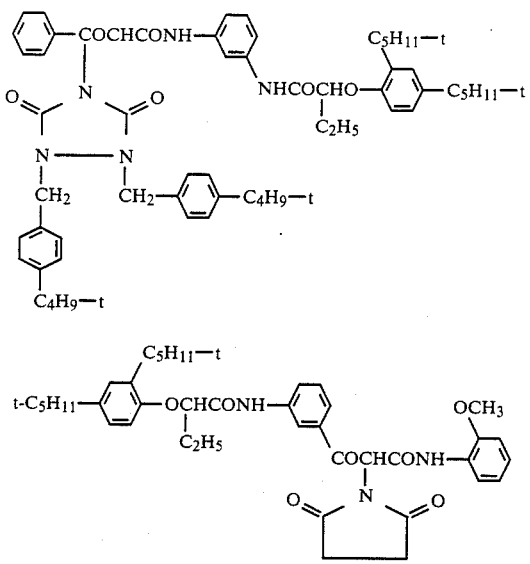

As the magenta dye-forming coupler which may be employed in this invention, there may be employed pyrazolone type couplers generally known in the art, while phenol or naphthol type couplers may be employed as cyan dye-forming couplers.

Such couplers may be incorporated into the silver halide emulsion by any well-known techniques. For instance, the coupler can be dissolved in a high-boiling solvent such as tricresyl phosphate, dibutyl phthalate and so on, a low-boiling solvent such as ethyl acetate, butyl propionate and so on and a mixture thereof, then dispersed in an aqueous solution of gelatin containing a surface active agent and the resultant dispersion is added to the silver halide emulsion. Alternatively, the coupler having an alkali-solubility may be added by the Fisher dispersion method.

Other photographic additives may be also included into the light-sensitive silver halide photographic material of this invention. For instance, there may be employed an antifoggant, a stabilizer, an ultra violet absorber, a color image antidiscloration agent, an anticolor stain agent, a brightening agent, an antistatic agent, a hardening agent, a surface active agent, a plasticizer, a wetting agent and the like.

In the light-sensitive silver halide photographic material of this invention, the hydrophilic colloid which may be employed for preparing a light-sensitive emulsion may include, for example, gelatin, a gelatin derivative, a graft polymer of gelatin with other polymer, a protein, e.g. albumin or casein, a cellulose derivative, e.g. hydroxyethylcellulose or carboxymethylcellulose, a starch derivative, a synthetic hydrophilic polymer of a homopolymer, e.g. polyvinyl alcohol, polyvinyl imidazole or polyacrylamide or a copolymer.

The green-sensitive and red-sensitive emulsions which may be employed together with the present light-sensitive silver halide photographic material can be optically sensitized with a suitable sensitizing dye in order to impart photosensitivities to the respective desired light-sensitive wave length regions. As the sensitizing dye, there may be used any of various dyes alone or in combination of the two or more thereof. Examples of the sensitizing dyes which may be advantageously employed in this invention may include the following: Namely, as representative examples of the sensitizing dye for the green-sensitive emulsion, there may be mentioned the cyanine dyes, merocyanine dyes or complex cyanine dyes as disclosed, e.g. in U.S. Pat. Nos. 1,939,201, 2,072,908, 2,739,149, 2,945,763 and British Pat. No. 505979. As representative examples of the sensitizing dye for the red-sensitive emulsion, there may be mentioned the cyanine dyes, merocyanine dyes or complex cyanine dyes as disclosed, e.g. in U.S. Pat. Nos. 2,269,234, 2,270,378, 2,442,710, 2,454,629 and 2,776,280. And yet, the cyanine dyes, merocyanine dyes or complex cyanine dyes as disclosed in U.S. Pat. Nos. 2,213,995, 2,493,748, 2,519,001 and West German Pat. No. 9 29 080 may be advantageously employed for the green-sensitive or red-sensitive emulsions.

The light-sensitive silver halide photographic material of this invention can be prepared by coating the blue-sensitive emulsion layer of this invention, if necessary, having incorporated therein various photographic additives as stated above, together with a green-sensitive emulsion layer, a red-sensitive emulsion layer and other constituting layers onto a base treated by corona discharge, flame or ultra violet irradiation or onto a base through a subbing layer and/or an interlayer.

As the base which may be advantageously employed, there may be mentioned, for example, a baryta paper, a polyethylene coating paper, a polypropylene synthetic paper, a glass sheet, a polyester film, e.g. polyethyleneterephthalate and so on, a polyamide film, a polycarbonate film, a polystyrene film and the like and these bases may be optionally selected depending upon the purposes of using the light-sensitive silver halide photographic materials.

In this invention, even if the said light-sensitive emulsion layers may be arranged in any order, there can be accomplished favourable effects which this invention aims at, but it is especially preferable that the blue-sensitive layer, the green-sensitive layer and then the red-sensitive layer are coated in this order onto a base.

In the light-sensitive silver halide photographic material according to this invention, an interlayer with a suitable thickness may be optionally placed according to the intended object and also a suitable combination of various layers such as a filter layer, an anticurling layer, a protective layer, an antihalation layer and the like may be used as constituting layers. In such constituting layers, there may be similarly employed as a binding agent the hydrophilic colloid which may be employed for the light-sensitive emulsion as stated above and also there may be similarly incorporated into the said layers a variety of photographic additives which may be employed for the light-sensitive emulsion as stated above.

The present light-sensitive silver halide photographic material may be utilized for various uses and show excellent characteristics according to the respective objects and then may be used, for instance, for general negative light-sensitive materials, general reversal light-sensitive materials, general positive light-sensitive materials, direct positive light-sensitive materials, specific (e.g., printing, X ray, high resolving power, infrared, ultraviolet and so on) light-sensitive silver halide photographic materials, and the present material is particularly suitable for color printing papers.

The present light-sensitive silver halide color photographic materials can be advantageously color-developed after exposure according to a color development method commonly employed for coupler-in-emulsion type light-sensitive silver halide color photographic materials. According to reversal development, the material is first developed with a black and white developing solution, exposed to white light or treated in a bath containing a fogging agent and further color-developed with an alkali developing solution containing a color developing agent. After color development, the material is bleached with a bleaching bath containing as an oxidizing agent such as a ferricyanide or a ferric salt of an aminopolycarboxylic acid (e.g., ethylenediaminetetracetic acid, nitrilotriacetic acid, N-hydroxyethylethylenediaminediacetic acid) or a metal complex of polycarboxylic acid (e.g., malonic acid, tartaric acid, malic acid, diglycolic acid, dithioglycolic acid and the like) and then fixed with a fixer containing a solvent for the silver salt such as a thiosulfate to leave a dye image with removal of a silver image and residual silver halide. Instead of the bleaching bath and fixer employed, bleach-fix may be conducted by using a combined developing and fixing bath containing both an oxidizing agent, e.g. ferric salts of aminopolycarboxylic acids and a solvent for silver salts, e.g. thiosulfates. Also, respective steps of washing, stopping, stabilizing and the like may be further applied in combination with color development, bleach, fix or bleach-fix. In particular, advantageous development steps for the present light-sensitive silver halide color photographic material may involve those steps of color development, washing (where necessary), bleach-fix, washing, stabilizing (where necessary) and drying and such treating steps may be effected, for example, at a higher temperature of not less than 30° C. within an extremely short period of time.

The particularly useful color developing agent which may be employed for color development of the present light-sensitive silver halide color photographic material is a primary phenylenediamine and its derivative and representative examples thereof may include, for example, the following: N,N-dimethyl-p-phenylenediamine, N,N-diethyl-p-phenylenediamine, N-carbamidomethyl-N-methyl-p-phenylenediamine, N-carbamidomethyl-N-tetrahydrofuryl-2-methyl-p-phenylenediamine, N-ethyl-N-carboxymethyl-2-methyl-p-phenylenediamine, N-carbamidomethyl-N-ethyl-2-methyl-p-phenylenediamine, N-ethyl-N-tetrahydrofurfuryl-2-methyl-p-aminophenol, N-ethyl-N-$\beta$-methanesulfonamidoethyl-4-aminoaniline, N-ethyl-N-$\beta$-methanesulfonamidoethyl-3-methyl-4-aminoaniline, N-methyl-N-$\beta$-sulfoethyl-p-phenylenediamine sodium salt and the like.

The light-sensitive silver halide photographic material of this invention, which contains such color developing agents as the color developing agent itself or its precursor in the hydrophilic colloid layer, may be treated with an alkaline activating bath. The color developing agent precursor is a compound capable of producing the color developing agent under alkaline condition: There may be mentioned a Schiff base type precursor with an aromatic aldehyde derivative, a polyvalent metal ion complex precursor, a phthalic imide derivative precursor and a urethane type precursor. Such aromatic primary amine color developing agents are disclosed, for example, in U.S. Pat. Nos. 3,342,599, 2,507,114, 2,695,234, 3,719,492, British Pat. No. 803783, Japanese Patent Provisional Publications No. 185628/1978 and No. 79035/1979, and "Research Disclosure" 15159, 12146 and 13924.

Such aromatic primary amine color developing agent or its precursor, when activation treated, should be incorporated in an amount as such to provide a sufficient coloration. The amount may considerably vary depending upon the sort of a light-sensitive material and so on, but it may be usually employed in the range of 0.1 to 5 moles per mole of the photosensitive silver halide, preferably 0.5 to 3 moles. Such color developing agent or its precursor may be employed alone or in combination therewith. The agent or precursor may be involved into the light-sensitive material in the form of its solution in a suitable solvent such as water, methanol, ethanol, acetone or in the form of its emulsified dispersion in a high boiling organic solvent such as dibutyl phthalate, dioctyl phthalate, tricresyl phosphate, or may be added in the form of a latex polymer having it incorporated therein as disclosed in "Research Disclosure", 14850.

This invention will be more fully illustrated by way of the following Examples, but these Examples are not to be construed as limiting the scope of this invention.

In some Examples, explanation will be given by referring to one or more of the FIGS. 1 through 5.

Figure 2:
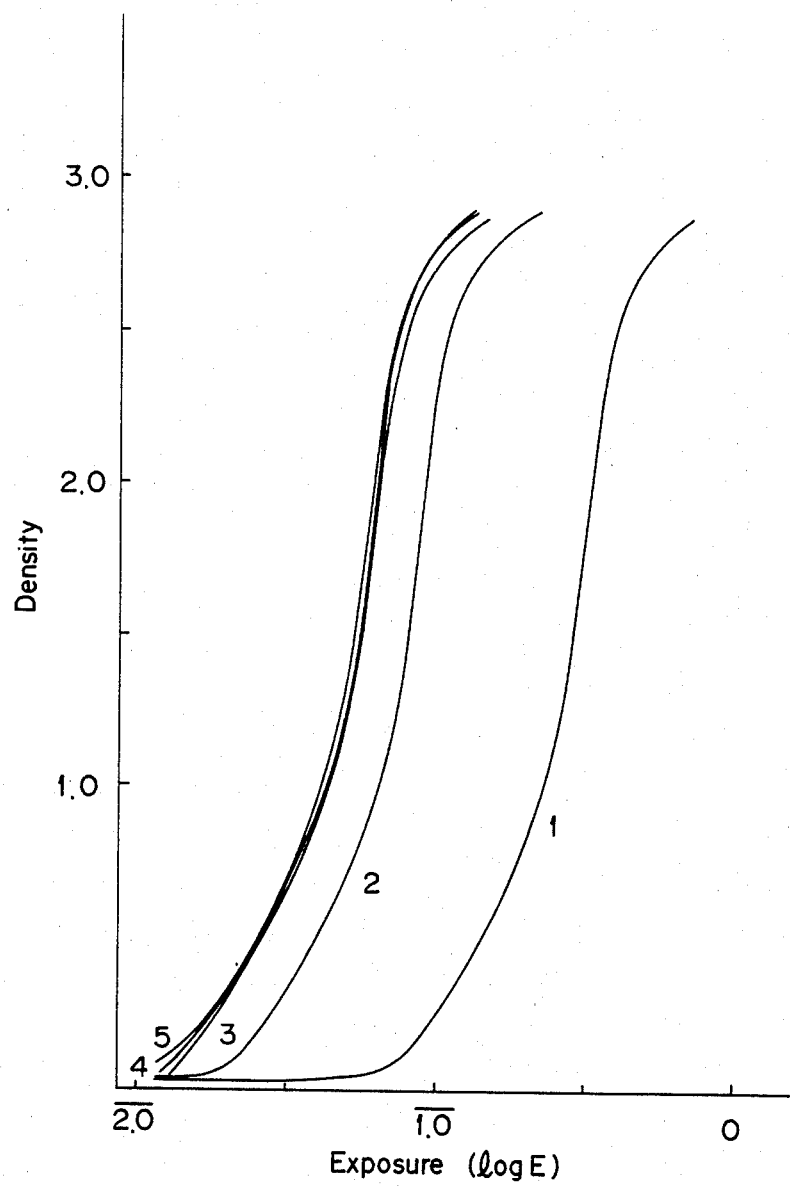
Figure 3:
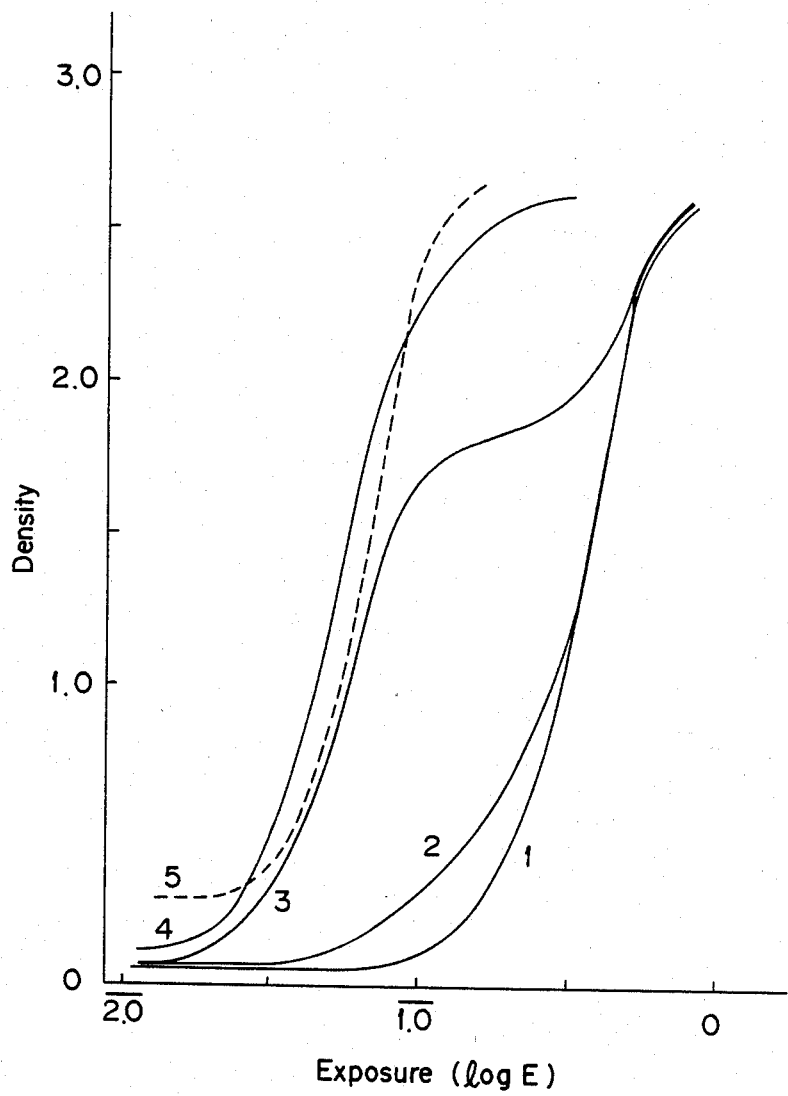
Figure 4:
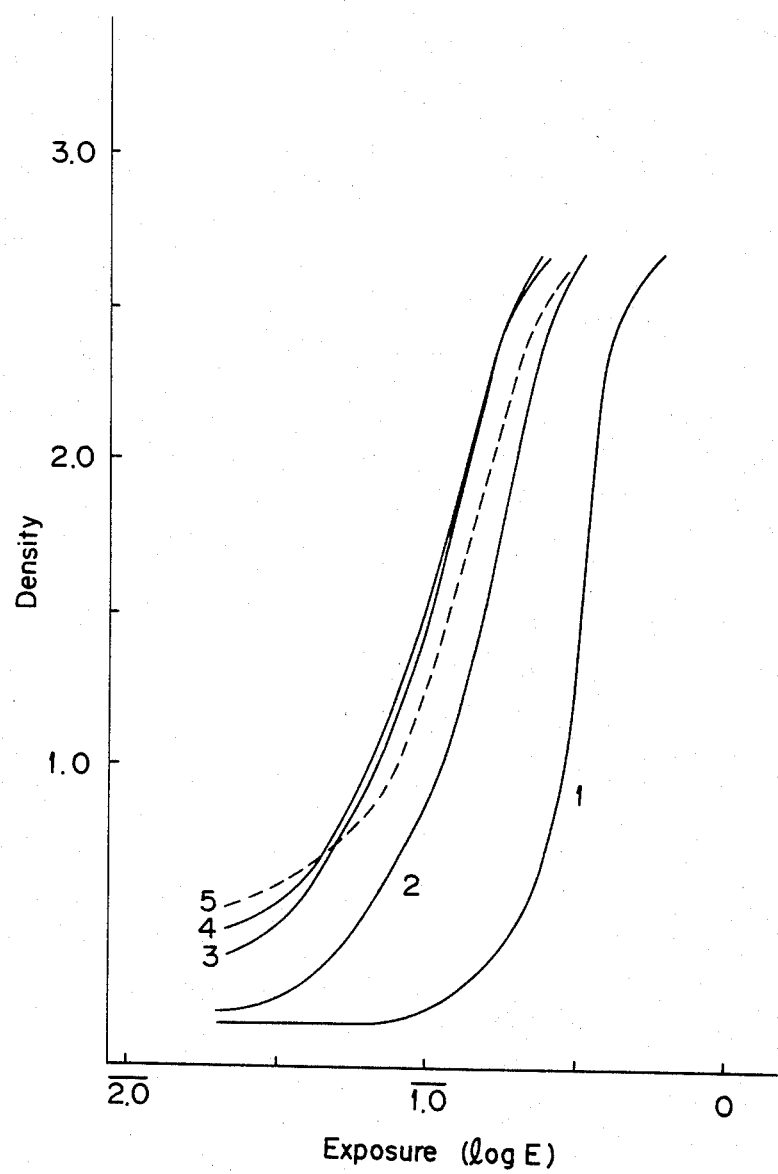
Figure 5:
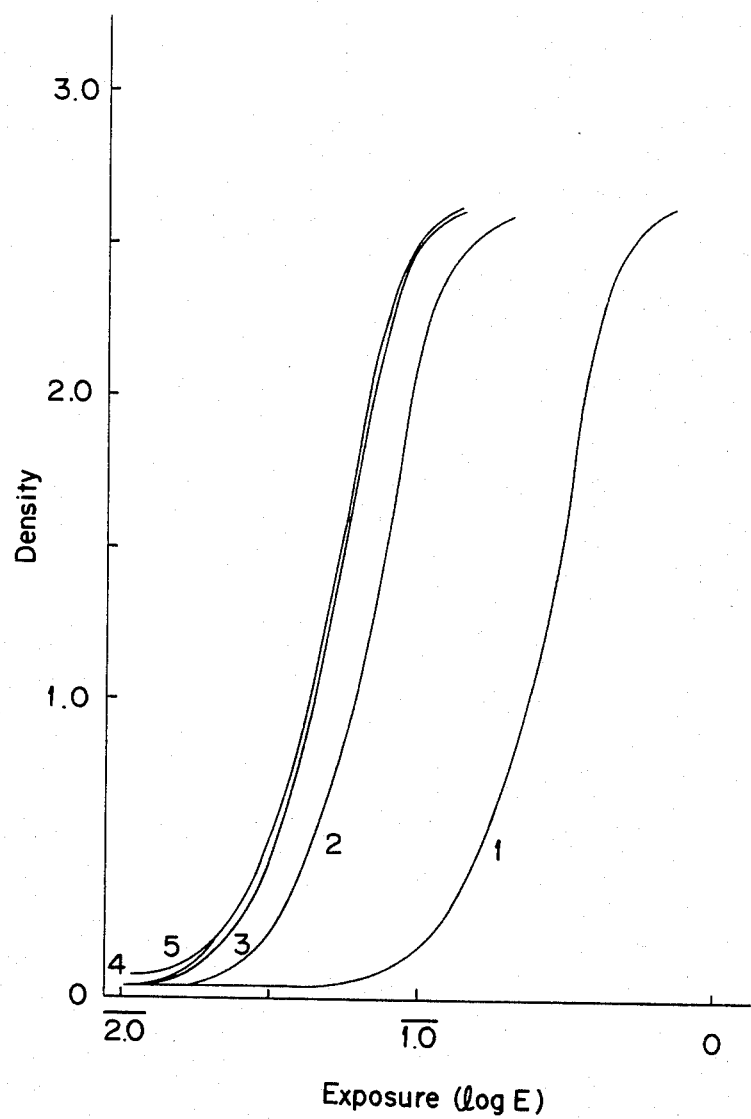

FIG. 1 illustrates changes in rational curves as chemical ripening proceeds where Comparative Dye A is added prior to chemical ripening of a silver chloride emulsion. In this Fig., ripening time is measured immediately after the addition of sodium thiosulfate and curves 1, 2, 3, 4 and 5 are drawn after ripening times of 0, 30, 50, 70 and 90 minutes, respectively. FIG. 2 illustrates changes in rational curves where Illustrative Dye 5 is added similarly. In this FIG. 2, ripening time and curves 1 through 5 are determined similarly to FIG. 1. FIG. 3 illustrates changes in rational curves as chemical ripening of a silver chloride emulsion proceeds. In this FIG. 3, exposures can not be directly compared differently from FIGS. 1 and 2 and curves 1, 2, 3, 4, and 5 are drawn after ripening times of 0, 60, 75, 90, and 105 minutes, respectively. FIG. 4 illustrates changes in rational curves as determined in the same manner as in FIG. 1 except that Comparative Dye E is employed. FIG. 5 illustrates changes in rational curves as determined in the same manner as in FIG. 2 except that Illustrative Dye 25 is employed.

EXAMPLE 1

A silver chloride emulsion having an average grain size of 0.6 $\mu$m and prepared according to a neutral simultaneous mixing method was chemically ripened by using $2 \times 10^{-5}$ mole of sodium thiosulfate.5 hydrate per mole of the silver halide according to a conventional method and then divided into 20 portions. Then, each of the sensitizing dyes indicated in the following Table 1 was added thereto, after through stirring, a stabilizer (Stabilizer No. 1) was added at a ratio of 1 g per mole of the silver halide, and then a dispersion of a yellow coupler (YC-1) at a ratio of 0.3 mole per mole of the silver halide with a color stain preventing agent (Color stain preventing agent No. 1) at a ratio of 0.15 mole per mole of the said coupler in dibutyl phthalate (hereinafter referred to as DBP) was added thereto. The said emulsion was coated onto a photographic base coated with polyethylene and containing an anatase type titanium oxide at 0.35 g/m² (in terms of silver) and 3 g of gelatin/m² and then gelatin coated thereonto as a protective layer at 2 g/m². Into the coated product were incorporated bis(vinylsulfonylmethyl)ether as a hardening agent and saponin as a spreader.

Each sample as prepared above was subjected to optical wedge exposure to blue light using a sensitometer (Konishiroku Photo Ind. Co., Ltd., Japan; Type KS-7) and subsequently to color development as depicted below.

In this example, the said Stabilizer No. 1 is 4-hydroxy-6-methyl-1,3,3a,7-tetraazaindane; the said YC-1 is α-(1-benzyl-2,4-dioxo-3-imidazolidinyl)-α-pivalyl-2-chloro-5-[γ-(2,4-di-tert-amylphenoxy)-butaneamido]acetanilide; and the said color stain preventing agent is 2,5-di-tert-octylhydroquinone.

| Treatment Steps: | | |
| --- | --- | --- |
| Color development | 33° C. | 3 min. 30 sec. |
| Bleach-fix | 33° C. | 1 min. 30 sec. |
| Washing | 30~34° C. | 3 min. |
| Drying | | |

| Formulation of Color Developing Solution | |
| --- | --- |
| Pure water | 800 ml |
| Ethylene glycol | 15 ml |
| Benzyl alcohol | 18 ml |
| Hydroxylamine sulfate | 20 g |
| Anhydrous potassium carbonate | 30.0 g |
| Potassium bromide | 0.5 g |
| Sodium chloride | 1.5 g |
| Anhydrous potassium sulfite | 2.0 g |
| N—Ethyl-N—β-methanesulfonamidoethyl-3-methyl-4-aminoaniline sulfate | 4.5 g |
| Pure water is added in a volume to make up 1 l and pH is adjusted to 10.2 with potassium hydroxide or sulfuric acid. | |

| Formulation of Bleach-fix Bath | |
| --- | --- |
| Pure water | 750 ml |
| Sodium (ethylenediaminetetraacetato) iron (III) complex | 50 g |
| Ammonium thiosulfate | 85 g |
| Sodium bisulfite | 1.0 g |
| Sodium metabisulfite | 2 g |
| Disodium ethylenediaminetetraacetate | 20 g |
| Sodium bromide | 3.0 g |
| Pure water is added in a volume to make up 1 l and pH is adjusted to 7.0 with aqueous ammonia or sulfuric acid. | |

Dye image formed in each sample was measured for reflection density by using a photoelectric densitometer (Konishiroku Photo Ind. Co., Ltd; Type PDA-60) and a blue filter attached thereto. Each characteristics value in photographic fog sensitivity gradiation was measured. The results are summarized in the following Table 1.

TABLE 1

| Sample No. | Sensitizing dye | Added amount (mole/mole of Ag) | Photographic fog | Relative sensitivity |
| --- | --- | --- | --- | --- |
| 1 | Comparative dye A | $3 \times 10^{-4}$ | 0.12 | 73 |
| 2 | Comparative dye A | $5 \times 10^{-4}$ | 0.15 | 65 |
| 3 | Comparative dye B | $3 \times 10^{-4}$ | 0.11 | 60 |
| 4 | Comparative dye C | $3 \times 10^{-4}$ | 0.12 | 29 |
| 5 | Comparative dye D | $3 \times 10^{-4}$ | 0.11 | 47 |
| 6 | Comparative dye E | $3 \times 10^{-4}$ | 0.11 | 52 |
| 7 | Comparative dye F | $3 \times 10^{-4}$ | 0.12 | 15 |
| 8 | Comparative dye G | $3 \times 10^{-4}$ | 0.11 | — |
| 9 | Comparative dye H | $3 \times 10^{-4}$ | 0.11 | — |
| 10 | Comparative dye I | $3 \times 10^{-4}$ | 0.10 | 21 |
| 11 | Comparative dye J | $3 \times 10^{-4}$ | 0.11 | — |
| 12 | Comparative dye K | $3 \times 10^{-4}$ | 0.14 | 4 |
| 13 | Comparative dye L | $3 \times 10^{-4}$ | 0.10 | 26 |
| 14 | Present illustrative dye No. 4 | $3 \times 10^{-4}$ | 0.07 | 106 |
| 15 | Present illustrative dye No. 5 | $3 \times 10^{-4}$ | 0.07 | 142 |
| 16 | Present illustrative dye No. 6 | $3 \times 10^{-4}$ | 0.06 | 125 |
| 17 | Present illustrative dye No. 7 | $3 \times 10^{-4}$ | 0.06 | 178 |
| 18 | Present illustrative dye No. 8 | $3 \times 10^{-4}$ | 0.06 | 135 |
| 19 | Present illustrative dye No. 12 | $3 \times 10^{-4}$ | 0.06 | 99 |
| 20 | Present illustrative dye No. 13 | $3 \times 10^{-4}$ | 0.07 | 100 |
| 21 | Present illustrative dye No. 18 | $3 \times 10^{-4}$ | 0.08 | 94 |
| 22 | Present illustrative dye No. 20 | $3 \times 10^{-4}$ | 0.07 | 95 |
| 23 | Present illustrative dye No. 1 | $3 \times 10^{-4}$ | 0.07 | 109 |
| 24 | None | — | 0.10 | — |

(Notes)
1. Sensitivity is represented as sensitivity of Sample No. 20 to blue light being defined as 100.
2. Comparative Dyes:

A: 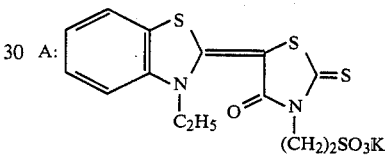

B: 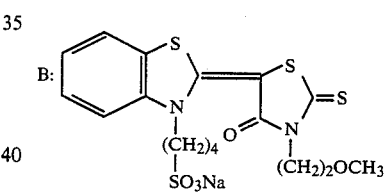

C: 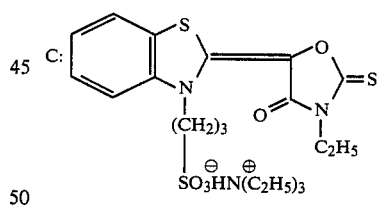

D: 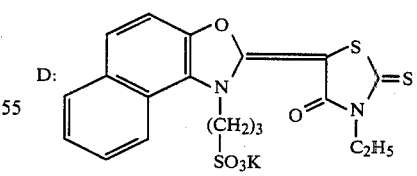

E: 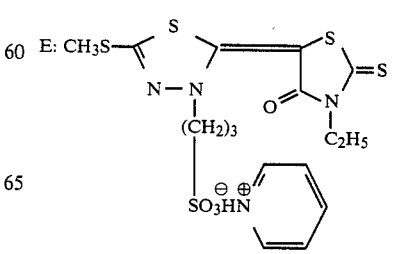

TABLE 1-continued

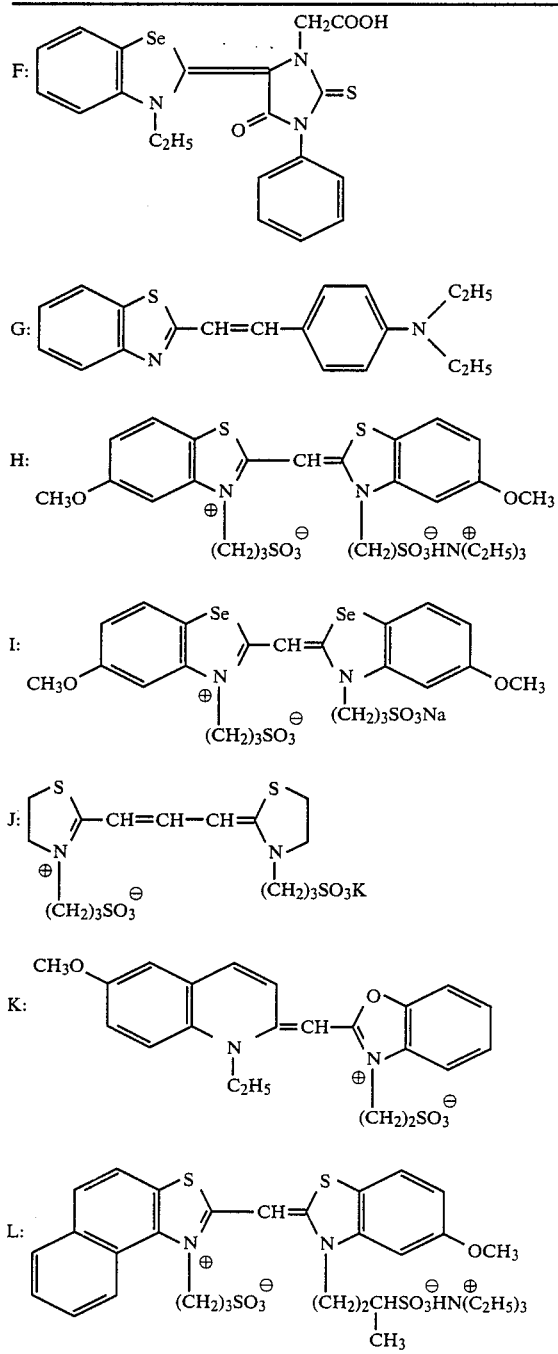

As apparent from the above Table 1, it has been seen that the present Samples No. 14 to No. 23 have remarkably superior photographic fog and sensitivity as compared with those of Comparative Samples No. 1 to No. 13.

EXAMPLE 2

A silver chloride emulsion having an average grain size of 0.7 μm and prepared according to a neutral simultaneous mixing method was adjusted to pH 5.8 and pAg 7.6, divided into 3 portions and then chemically ripened.

SAMPLE NO. 25

The said Comparative Dye A was added at $3 \times 10^{-4}$ mole per mole of the silver halide. After 5 minutes, sodium thiosulfate.5 hydrate was added at $1 \times 10^{-5}$ mole per mole of the silver halide and chemical ripening was effected at 55° C.

SAMPLE NO. 26

The same procedures as done for the Sample No. 25 were repeated except that the said Illustrative Dye No. 5 was added at $3 \times 10^{-4}$ mole per mole of the silver halide.

SAMPLE NO. 27

Sodium thiosulfate.5 hydrate was added at $1 \times 10^{-5}$ mole per mole of the silver halide and chemical ripening was effected at 60° C.

At every ripening time, coated samples were prepared according to the procedures of Example 1 except that no dye was added at the end of ripening. Exposure and development were effected according to the procedures of Example 1, but Sample No. 23 was exposed to an increased exposure because of no sensitizing dye contained therein.

The results are shown in the FIG. 1 (Sample No. 25), FIG. 2 (Sample No. 26) and FIG. 3 (Sample No. 27), respectively.

In Comparative Sample No. 27 containing no dye, it will be well appreciated that gradiation is not sufficiently restored at the point wherein change in gradiation reaches the maximum sensitivity as chemical ripening proceeds, although photographic fog is already beginning to increase and that an induction period is longer and subsequent change is more rapid.

In Comparative Sample No. 25 and Sample No. 26, changes in gradiation, on the other hand, are hardly observed. However, in the Comparative Sample, when a far less sensitization is shown than sensitivity increased by chemical ripening as seen in the sample containing no dye, photographic fog was already beginning to increase and also soft gradiation has been wholly observed. The Sample No. 26 of this invention did not show such defects.

Example 1 revealed that the present sensitizing dye can accomplish a lower photographic fog and a higher sensitivity when applied to emulsions chemically ripened in similar manner. Moreover, Example 2 showed that the present sensitizing dye can improve behaviors characteristic of chemical ripening of high silver chloride.

These defects have been a very serious problem in preparing a light-sensitive color photographic material from a high chloride-silver halide emulsion.

It will be, therefore, easily appreciated that the present sensitizing dye is highly useful for sufficiently utilizing superior properties of a high chloride-silver halide as a light-sensitive color photographic material.

EXAMPLE 3

A photographic paper base covered with a polyethylene coating film containing anatase type titanium oxide was subjected to corona discharge and the following 6 layers were in turn overcoated thereonto to prepare a color light-sensitive material for printing. Amount of each substance is represented in terms of the amount per 1 m² of a light-sensitive material and a silver halide in terms of silver.

LAYER 1

A blue-sensitive emulsion layer containing 0.45 g of a blue-sensitive silver chloride emulsion (an average grain size of 0.7 μm), 1.47 g of gelatin and 0.4 g of DBP having dissolved therein 0.8 g of the yellow coupler (YC-1 in Example 1) and 0.015 g of the color stain preventing agent (Color stain preventing agent of Example 1).

LAYER 2

A first interlayer containing 0.03 g of DBP having dissolved therein 1.03 g of gelatin and 0.015 g of the color stain preventing agent of Example 1.

LAYER 3

A green-sensitive emulsion layer containing 0.4 g of a green-sensitive silver chloride emulsion (an average grain size of 0.45 μm), 1.85 g of gelatin and 0.34 g of tricresyl phosphate (hereinafter referred to as TCP) having dissolved therein 0.63 g of a magenta coupler (MC-1).
(Note) MC-1: 3-[2-Chloro-5-(1-octadecenylsuccinimido)anilino]-1-(2,4,6-trichlorophenyl)-5-pyrazolone.

LAYER 4

A second interlayer containing 0.22 g of DBP having dissolved therein 1.45 g of gelatin, 0.2 g of an ultraviolet absorber (UV-1), 0.3 g of an ultraviolet absorber (UV-2) and 0.05 g of the color stain preventing agent of Example 1.
(Note)
UV-1: 2-(2-Hydroxy-3,5-di-tert-butylphenyl)-benzotriazole.
UV-2: 2-(2-Hydroxy-5-tert-butylphenyl)-benzotriazole.

LAYER 5

A red-sensitive emulsion layer containing 0.3 g of a red-sensitive silver chloride emulsion (an average grain size of 0.40 μm), 1.6 g of gelatin and 0.3 g of DBP having dissolved therein 0.42 g of a cyan coupler (CC-1), 0.05 g of DMCH and 0.005 g of the color stain preventing agent of Example 1.
(Note) CC-1: 2-[2-(2,4-Di-tert-aminophenoxy)-butaneamido]-4,6-dichloro-5-methylphenol.

LAYER 6

A protective layer containing 1.8 g of gelatin.

The silver halide emulsion used in the Layer 1 was prepared as stated below: Sodium thiosulfate.5 hydrate was added at $1 \times 10^{-5}$ mole per mole of the silver halide emulsion, chemical ripening was effected and, before 5 minutes of completion of chemical ripening, a 0.1% W/V solution of the sensitizing dye previously prepared was then added thereto. After 5 minutes, a 0.5% W/V solution of the stabilizer, Stabilizer 1 of Example 1, was added at the end of chemical ripening. After completion of the addition, a 10% W/V aqueous solution of gelatin was added, stirred, cooled and then set.

The silver halide emulsion used in the Layer 3 was prepared by the same procedures as for the emulsion of the Layer 1 except that chemical ripening was effected by using sodium thiosulfate.5 hydrate at $1.5 \times 10^{-5}$ mole per mole of the silver halide and anhydro 5,5'-diphenyl-9-ethyl-3,3'-di(2-sulfoethyl)oxacarbocyanine hydroxide was used as a sensitizing dye at $3 \times 10^{-4}$ mole.

The silver halide emulsion used in the Layer 5 was prepared by the same procedures as for the emulsion of the Layer 3 except that 3,3'-di(2-hydroxyethyl)-thiadicarbocyanine bromide was used as a sensitizing dye at $3 \times 10^{-4}$ mole per mole of the silver halide.

In addition to the above materials, bis-(vinylsulfonylmethyl)ether was incorporated therein as a hardening agent and saponin as a coating aid.

Sample No. 28 was prepared under the same conditions as above except that respective emulsion layers of the present Samples No. 29 and No. 30 were replaced by a silver chlorobromide emulsion having an average grain size of 0.7 μm and containing 15 molar % of silver chloride (a blue-sensitive emulsion layer), a silver chlorobromide emulsion having an average grain size of 0.45 μm and containing 20 molar % of silver chloride (a green-sensitive emulsion layer) and a silver chlorobromide emulsion containing 20 molar % of silver chloride with an average grain size of 0.4 μm (a red-sensitive emulsion layer). In the blue-sensitive emulsion layer, an amount of the sensitive dye to be added was $3 \times 10^{-4}$ mole per mole of the silver and the dyes as employed are shown below.

| Sample No. | |
| --- | --- |
| 28 | Comparative Dye H |
| 29 | Illustrative Dye 5 |
| 30 | Illustrative Dye 8 |

The above-mentioned 3 Samples were exposed and printed through a color negative and then color-developed in the same manner as in Example 1, thereby producing color prints by both Sample No. 29 and Sample No. 30 which showed good color reproduction and tone reproduction comparable to those by Comparative Sample No. 28. Particularly, it has been found that reduction in saturation can be prevented up to a high density region with respect to red and green and a color photographic paper having silver chloride can accomplish an improvement in color reproduction as compared with the prior art photographic paper using silver chlorobromide.

EXAMPLE 4

Following the same procedures and conditions as in Example 1 except that the sensitizing dyes indicated in the following Table 2 were employed, samples were prepared. They were exposed and developed in the same manner as in Example 1. Then, reflection density of the dye image in each sample was measured in the same manner as in Example 1. The results are shown in Table 2.

TABLE 2

| Sample No. | Sensitizing dye | Added amount (mole/mole of Ag) | Photographic fog | Relative sensitivity |
| --- | --- | --- | --- | --- |
| 31 | Comparative dye M | $3 \times 10^{-4}$ | 0.14 | 39 |
| 32 | Comparative dye N | $3 \times 10^{-4}$ | 0.11 | 45 |
| 33 | Comparative dye O | $3 \times 10^{-4}$ | 0.12 | 8 |
| 34 | Comparative dye P | $3 \times 10^{-4}$ | 0.11 | 27 |
| 35 | Present illustrative dye No. 22 | $3 \times 10^{-4}$ | 0.11 | 111 |
| 36 | Present illustrative | $3 \times 10^{-4}$ | 0.06 | 106 |

TABLE 2-continued

| Sample No. | Sensitizing dye | Added amount (mole/mole of Ag) | Photo- graphic fog | Relative sensi- tivity |
|---|---|---|---|---|
| 37 | Present illustrative dye No. 25 | $3 \times 10^{-4}$ | 0.07 | 105 |
| 38 | Present illustrative dye No. 30 | $3 \times 10^{-4}$ | 0.06 | 97 |
| 39 | Present illustrative dye No. 32 | $3 \times 10^{-4}$ | 0.06 | 100 |
|  | Present illustrative dye No. 21 |  |  |  |
| 40 | None | — | 0.10 | — |

(Notes)
1. Sensitivity is represented as sensitivity of Sample No. 39 to blue light being defined as 100.
2. Comparative Dyes:

M
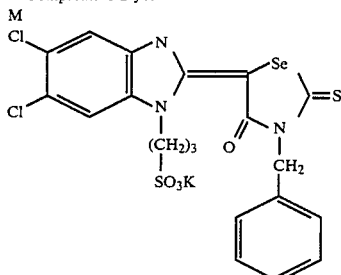

N
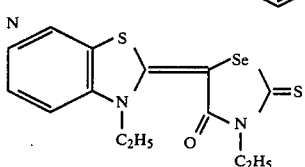

O
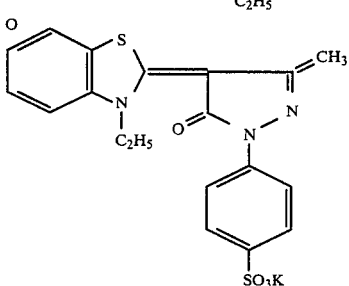

P
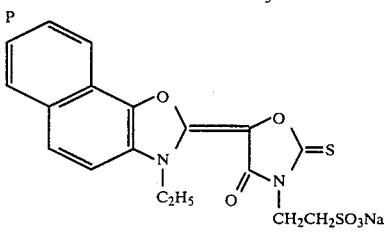

Q
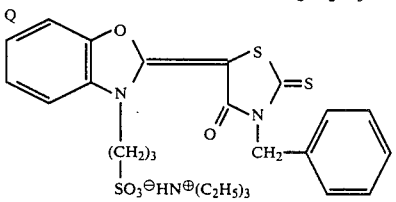

As apparent from the Table 2, it has been seen that the present Samples No. 35 to No. 39 can show remarkably superior photographic fog and sensitivity as compared with the Comparative Samples No. 31 to No. 34.

EXAMPLE 5

A silver chloride emulsion with an average grain size of 0.8 μm prepared according to a neutral simultaneous mixing method was adjusted to pH 5.8 and pAg 7.6 and then divided into 6 portions. Each of the sensitizing dyes indicated in the following Table 3 was added to the emulsion and, after 5 minutes, sodium thiosulfate.5 hydrate was added at $2 \times 10^{-5}$ mole per mole of the silver halide and chemical ripening was effected at 55° C. According to the procedures of Example 4, coated samples were prepared and developed. The results are shown in the following Table 3, wherein relative sensitivity and photographic fog are shown with regard to the maximum available sensitivity of each sample.

TABLE 3

| Sample No. | Sensitizing dye | Added amount (mole/mole of Ag) | Photo- graphic fog | Relative sensi- tivity |
|---|---|---|---|---|
| 41 | Comparative dye N | $2 \times 10^{-4}$ | 0.23 | 58 |
| 42 | Comparative dye Q | $2 \times 10^{-4}$ | 0.18 | 72 |
| 43 | Present illustrative dye No. 24 | $2 \times 10^{-4}$ | 0.08 | 106 |
| 44 | Present illustrative dye No. 28 | $2 \times 10^{-4}$ | 0.07 | 110 |
| 45 | Present illustrative dye No. 36 | $2 \times 10^{-4}$ | 0.07 | 97 |
| 46 | Present illustrative dye No. 21 | $2 \times 10^{-4}$ | 0.08 | 100 |

(Note)
Sensitivity is represented as sensitivity of Sample No. 21 to blue light being defined as 100.

As apparent from the above Table 3, it has been seen that the present samples can have a higher sensitivity and a lower photographic fog, as compared with comparative samples, even in the system in which a dye may coexist in chemical ripening.

EXAMPLE 6

Following the same procedures and conditions as in Example 2 except that Comparative Dye M and illustrative Dye No. 25 were employed, respectively, there were prepared Samples No. 47, No. 48 and No. 49.

At every ripening time, coated samples were prepared according to the procedure of Example 4 except that no dye was added at the end of ripening. Exposure and development were effected according to the procedures of Example 4, but Sample No. 49 was exposed to an increased exposure because of no sensitizing dye contained therein.

The results are shown in the FIG. 4 (Sample No. 47) and FIG. 5 (Sample No. 48), respectively.

Similar results can be seen as in Example 2.

EXAMPLE 7

Following the same procedures and conditions as in Example 3 except that Illustrative Dyes 22 and 28 and the following comparative dye were employed, there were prepared Samples No. 50 to No. 52 as shown below.

| Sample No. | | |
|---|---|---|
| 50 | Comparative Dye: | 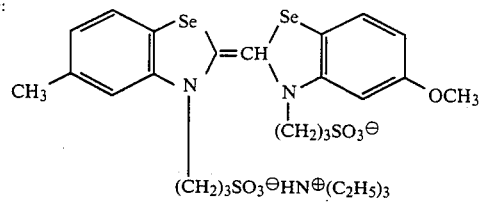
(CH₂)₃SO₃⁻HN⁺(C₂H₅)₃ |
| 51 | Illustrative Dye 22 | |
| 52 | Illustrative Dye 28 | |

With regard to the present Samples No. 51 and No. 52, there can be seen similar results as in Example 3.

We claim:

1. A light-sensitive silver halide photographic material having at least one silver halide emulsion layer on a support characterized in that silver halide in said emulsion layer comprises silver halide grains containing at least 80 molar % of silver chloride and at least one merocyanine dye having the formula (I)

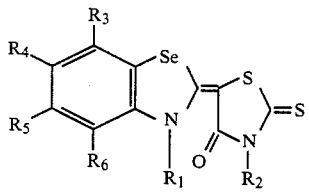 (I)

wherein $R_1$ is selected from the group consisting of an alkyl group, an alkenyl group and an aryl group and $R_2$ is selected from the group consisting of an alkyl having a sulfo substituent and an aryl having a sulfo substituent; and $R_3$, $R_4$, $R_5$ and $R_6$ are each selected from the group consisting of a hydrogen atom, a halogen atom, a lower alkyl group, a lower alkoxy group and a phenyl group and any one pair of $R_3$ and $R_4$, $R_5$ and $R_6$, $R_1$ and $R_6$ or $R_4$ and $R_5$ may join to form a ring.

2. The light-sensitive silver halide photographic material according to claim 1 wherein said material is a silver halide light-sensitive color photographic material.

3. The light-sensitive silver halide photographic material of claim 1 wherein said merocyanine dye is a compound having the formula

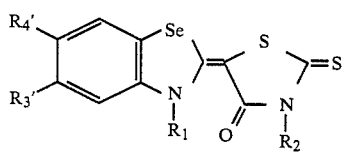

wherein $R_1$ is selected from the group consisting of an alkyl group, an alkenyl group and an aryl group and $R_2$ is selected from the group consisting of an alkyl having a sulfo substituent and an aryl having a sulfo substituent; and $R'_4$ and $R'_5$ are each selected from the group consisting of a hydrogen atom, a halogen atom, a lower alkyl group, a lower alkoxy group and a phenyl group.

4. The light-sensitive silver halide photographic material of claim 2 wherein said merocyanine dye is a compound selected from the group consisting of:

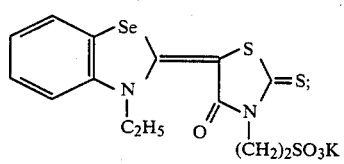 (A)

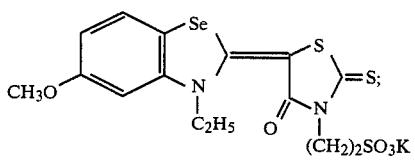 (B)

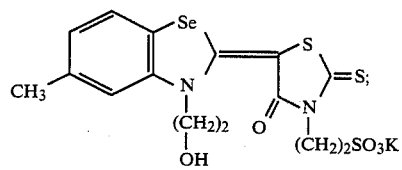 (C)

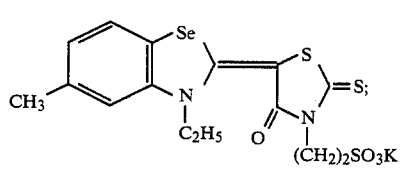 (D)

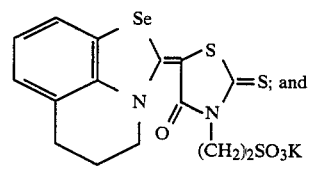 (E)

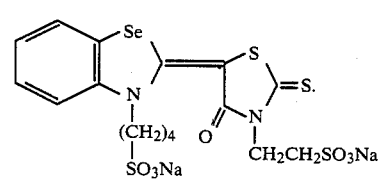 (F)

5. The light-sensitive silver halide photographic material of claim 2 wherein said merocyanine dye is compound (A).

6. The light-sensitive silver halide photographic material of claim 2 wherein said merocyanine dye is compound (B).

7. The light-sensitive silver halide photographic material of claim 2 wherein said merocyanine dye is compound (C).

8. The light-sensitive silver halide photographic material of claim 2 wherein said merocyanine dye is compound (D).

9. The light-sensitive silver halide photographic material of claim 2 wherein said silver halide in said emulsion layer is not more than 1 molar % of silver iodide, not more than 20 molar % of silver bromide and at least 80 molar % of silver chloride.

10. The light-sensitive silver halide photographic material according to claim 9 wherein said silver halide in said emulsion layer is 100 molar % of silver chloride.

11. The light-sensitive silver halide photographic material of claim 2 wherein said merocyanine dye is present in a ratio of $5\times10^{-5}$ to $3\times10^{-3}$ mole per mole of said silver halide.

12. The light-sensitive silver halide photographic material according to claim 11 wherein said merocyanine dye is present in a ratio of $1\times10^{-4}$ to $7.5\times10^{-4}$ mole per mole of said silver halide.

* * * * *

UNITED STATES PATENT AND TRADEMARK OFFICE
CERTIFICATE OF CORRECTION

PATENT NO. : 4,517,284

DATED : May 14, 1985

INVENTOR(S) : KAGAWA et al

It is certified that error appears in the above-identified patent and that said Letters Patent is hereby corrected as shown below:

In the Drawings:

Sheet 2 of 5, renumber "Fig. 2" as --Fig. 5--.

Sheet 5 of 5, renumber "Fig. 5" as --Fig. 2--.

Signed and Sealed this

Fourth Day of September, 1990

Attest:

HARRY F. MANBECK, JR.

*Attesting Officer*   *Commissioner of Patents and Trademarks*